United States Patent
McAlear

(10) Patent No.: US 8,302,174 B2
(45) Date of Patent: Oct. 30, 2012

(54) SYSTEM, DEVICE AND METHOD FOR SECURE PROVISION OF KEY CREDENTIAL INFORMATION

(75) Inventor: James A McAlear, Ottawa (CA)

(73) Assignee: James A. McAlear, Ottawa, ONT (CA)

( * ) Notice: Subject to any disclaimer, the term of this patent is extended or adjusted under 35 U.S.C. 154(b) by 0 days.

(21) Appl. No.: 13/140,383

(22) PCT Filed: Dec. 14, 2009

(86) PCT No.: PCT/CA2009/001832
§ 371 (c)(1),
(2), (4) Date: Jun. 17, 2011

(87) PCT Pub. No.: WO2010/069056
PCT Pub. Date: Jun. 24, 2010

(65) Prior Publication Data
US 2012/0131651 A1    May 24, 2012

Related U.S. Application Data

(63) Continuation of application No. 12/321,519, filed on Jan. 22, 2009.

(30) Foreign Application Priority Data

Dec. 18, 2008   (CA) ...................................... 2650163

(51) Int. Cl.
*G06F 21/00* (2006.01)
(52) U.S. Cl. ............ 726/7; 709/223; 709/248; 380/278; 380/466; 713/151; 713/153
(58) Field of Classification Search ........................ 726/7
See application file for complete search history.

(56) References Cited

U.S. PATENT DOCUMENTS

| 5,822,435 A | 10/1998 | Boebert |
| 6,681,327 B1 | 1/2004 | Jardin |
| 6,834,271 B1 | 12/2004 | Hodgson |

(Continued)

FOREIGN PATENT DOCUMENTS

CA    2280869    8/1998

(Continued)

OTHER PUBLICATIONS

Office Action mailed Jan. 10, 2012 in copending U.S. Appl. No. 12/321,519, published as US-2010-0186070.

(Continued)

*Primary Examiner* — David Pearson
*Assistant Examiner* — Mahfuzur Rahman
(74) *Attorney, Agent, or Firm* — Oppendahl Patent Law Firm LLC

(57) ABSTRACT

A system for secure provision of key credential information is provided. The system comprises secure logic circuitry for being disposed in a host computer. The secure logic circuitry detects a message received from a remote computer connected to the host computer and indicative of a request for provision of the key credential information; generates a message for prompting a user for provision of the key credential information; receives the key credential information; and provides the key credential information to the remote computer absent processing using circuitry of the host computer. The system further comprises a secure user interface connected to the secure logic circuitry for receiving the key credential information from the user and providing the same to the secure logic circuitry.

17 Claims, 4 Drawing Sheets

U.S. PATENT DOCUMENTS

| | | | |
|---|---|---|---|
| 6,873,988 B2 | 3/2005 | Herrmann | |
| 7,054,845 B2 | 5/2006 | Oshima | |
| 7,546,629 B2 | 6/2009 | Albert | |
| 7,725,730 B2 * | 5/2010 | Juels et al. | 713/183 |
| 7,962,742 B2 | 6/2011 | Schwarz | |
| 2002/0156905 A1 | 10/2002 | Weissman | |
| 2003/0177389 A1 | 9/2003 | Albert | |
| 2004/0225848 A1 | 11/2004 | Wall | |
| 2007/0033273 A1 | 2/2007 | White | |
| 2007/0180505 A1 | 8/2007 | Patel | |
| 2007/0198825 A1 * | 8/2007 | Schwarz | 713/151 |
| 2007/0241182 A1 | 10/2007 | Buer | |
| 2008/0109889 A1 * | 5/2008 | Bartels | 726/7 |
| 2008/0184349 A1 | 7/2008 | Ting | |
| 2010/0061556 A1 | 3/2010 | Whitehead | |
| 2010/0083359 A1 | 4/2010 | Readshaw | |
| 2010/0186070 A1 | 7/2010 | McAlear | |
| 2010/0325715 A1 | 12/2010 | Deurbrouck | |

FOREIGN PATENT DOCUMENTS

| | | |
|---|---|---|
| CA | 2650163 | 6/2010 |
| EP | 1796052 A2 | 6/2007 |
| EP | 2131555 | 12/2009 |
| FR | 2850772 | 8/2004 |
| WO | 97-46931 | 12/1997 |
| WO | 2006/013912 | 2/2006 |
| WO | 2006-089710 | 8/2006 |

OTHER PUBLICATIONS

European Search Report Dated Mar. 1, 2012 for Copending European Application Published as EP2371084.

International Search Report mailed Feb. 25, 2010 in international patent application No. PCT/CA2009/001832.

Written Opinion mailed Feb. 25, 2010 in international patent application No. PCT/CA2009/001832.

Press Release dated Oct. 29, 2008 "IBM Research unveils 'Security-on-a-Stick' to protect consumers and banks from the most sophisticated hacker attacks".

* cited by examiner

SYSTEM, DEVICE AND METHOD FOR SECURE PROVISION OF KEY CREDENTIAL INFORMATION

FIELD OF THE INVENTION

The present invention relates to computer networking, and more particularly to a system for secure provision of key credential information to a server via an un-trusted computer.

BACKGROUND OF THE INVENTION

Commerce over the Internet has become very popular. Such commerce takes many forms, from purchasing merchandize from online vendors to conducting online banking and stock trading. Common to all such transactions is the need to transmit private secure information. Typically, the transactions are carried out using secure encrypted connections. However, there are still opportunities to capture the private information that is used during online transactions, for example, to obtain passwords, Personal Identification Numbers (PIN), social security numbers, driver's license numbers and account numbers, to name a few. Illegal procurement of such information and using the same in a fraudulent manner is commonly referred to as identity theft.

While the Internet is by far the largest and most pervasive computer network, the problem of identity theft occurs in other networks as well. For example, identity theft can occur entirely within the confines of a corporate network or a university network wherein a dishonest individual uses a transaction within the network to steal PINs enabling access to confidential information.

Many of the current security mechanisms assume that a user's computer and its keyboard are secure, which is incorrect. One form of conducting online identity theft is to use a keystroke logger to log individual keystrokes for extracting personal information. The keystroke logger is, for example, software installed on a computer without the user's knowledge and its operation is invisible to the user. The keystroke logger in the form of software is, for example, distributed and installed remotely—for example, in the form of malware—and transmits the key logs to a remote computer in an invisible fashion. Numerous anti-virus programs fight known malicious software programs and try to keep up with the proliferation of new malicious software programs.

It is desirable to provide a system for secure provision of key credential information to a server via an un-trusted computer.

It is also desirable to provide a system for secure provision of key credential information that is easily installed in an existing computer system.

SUMMARY OF THE INVENTION

Accordingly, one object of the present invention is to provide a system for secure provision of key credential information to a server via an un-trusted computer.

Another object of the present invention is to provide a system for secure provision of key credential information that is easily installed in an existing computer system.

According to one aspect of the present invention, there is provided a system for secure provision of key credential information. The system comprises secure logic circuitry for being disposed in a host computer. The secure logic circuitry detects a message received from a remote computer connected to the host computer which is indicative of a request for provision of the key credential information; generates a message for prompting a user for provision of the key credential information; receives the key credential information; and provides the key credential information to the remote computer absent processing using circuitry of the host computer. The system further comprises a secure user interface connected to the secure logic circuitry for receiving the key credential information from the user and providing the same to the secure logic circuitry.

According to another aspect of the present invention, there is further provided a method for secure provision of key credential information. Using a secure logic circuitry disposed in a host computer, a message received from a remote computer connected to the host computer which is indicative of a request for provision of the key credential information is detected. Using the secure logic circuitry, a message prompting a user for providing the key credential information is generated. Using a secure user interface connected to the secure logic circuitry, the key credential information is received from the user and provided to the secure logic circuitry. Using the secure logic circuitry, the key credential information is provided to the remote computer absent processing using circuitry of the host computer.

The advantage of the present invention is that it provides a system for secure provision of key credential information to a server via an un-trusted computer.

A further advantage of the present invention is that it provides a system for secure provision of key credential information that is easily installed in an existing computer system.

BRIEF DESCRIPTION OF THE DRAWINGS

A preferred embodiment of the present invention is described below with reference to the accompanying drawings, in which.

DESCRIPTION OF THE PREFERRED EMBODIMENT

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While the description of the preferred embodiments herein below is with reference to an Internet connection for sake of simplicity, it will become evident to those skilled in the art that the embodiments of the invention are not limited thereto, but are also applicable for use with various other networks such as, for example, corporate networks or university networks.

Figure 1A:
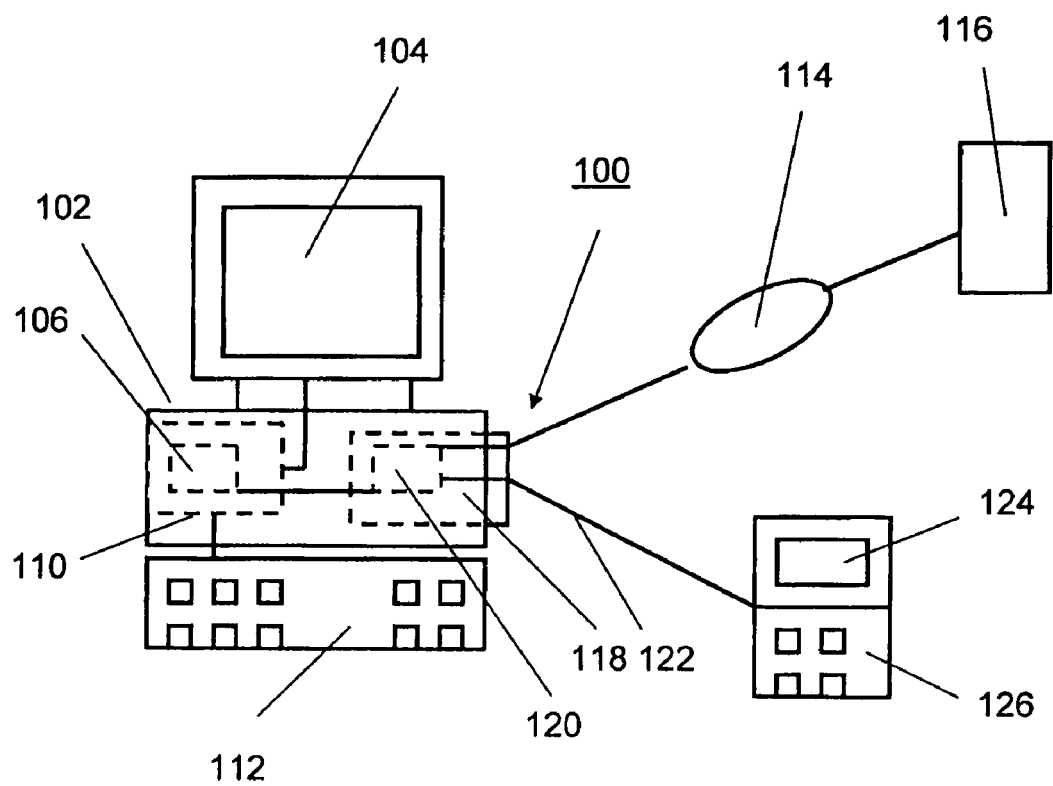
FIGS. 1A and 1B are simplified block diagrams of a system for secure provision of key credential information according to a preferred embodiment of the present invention; and, FIG. 2 is a simplified flow diagram of a method for secure provision of key credential information according to a preferred embodiment of the present invention.
Figure 1B:
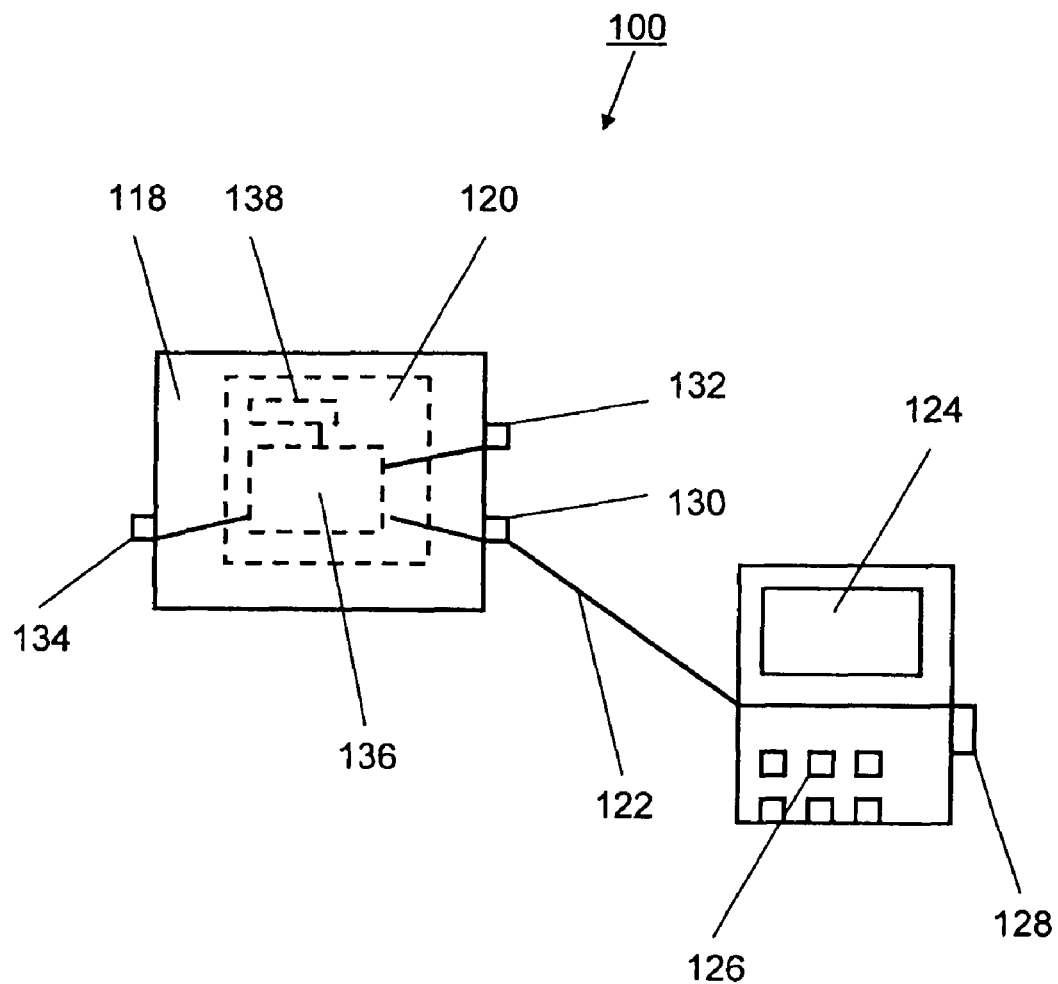

Referring to FIGS. 1A and 1B, a system for secure provision of key credential information 100 according to a preferred embodiment of the invention is provided. A user's Personal Computer (PC) or workstation 102 is connected via a communication network 114 such as, for example, the Internet, to a remote computer 116, for example, a server of an Internet based booking center or vendor. Typically, computers such as PCs and workstations communicate with the communication network 114 via a Network Interface Card (NIC)

118 which is connected to a motherboard 110 comprising a Central Processing Unit (CPU) 106 via an internal bus system. The user typically interacts with the computer 102 using key board 112 for providing information and commands to the CPU 106 and monitor 104 for visually receiving information, for example, in a graphical fashion.

The system for secure provision of key credential information 100 enables a user to communicate key credential information to the server 116 such that a malware having, for example, a surreptitious key logger capability, resident in the computer's CPU 106 or motherboard 110 is not able to see the provided key credential information.

The system for secure provision of key credential information 100 preferably comprises a NIC 118 having secure logic circuitry 120 connected to ports 130, 132, and 134. The ports 132 and 134 are connected to the communication network 114 and the internal bus system of the computer 102, respectively. The secure logic circuitry 120 comprises, for example, a processor 136 and memory 138 having executable commands stored therein for execution on the processor 136. The secure logic circuitry 120 scans messages received from the server 116 for detecting a message which is indicative of a request for provision of the key credential information. Typically, when a user attempts to invoke a service on a remote network resource, the server then sends a request for credentials message to the computer 102. For example, in conventional web browsing operations the CPU 106 of the computer 102 sends a HTTP GET message to the server 116 specifying a server resource and the server 116 replies with a HTTP 401 Authorization Required message with an embedded realm-title such as "Some-Service Login" to alert the user to exactly which set of key credentials are required for the requested resource.

When the secure logic circuitry 120 encounters a "request for key credentials" message the request is not passed to the computer motherboard 110—as is using conventional technology—but instead is passed to a secure user interface 124, 126 connected to the secure logic circuitry 120 via the port 130. The secure user interface comprises, for example, a secure keyboard 126 for receiving the key credential information from the user and a secure display 124 for displaying a message for prompting the user for provision of the key credential information. Alternatively, the secure user interface comprises a touch screen. The secure user interface is deployed, for example, as a peripheral device connected to the port 130 via cable 122. Alternatively, wireless communication is enabled between the secure logic circuitry 120 and the secure user interface 124, 126 using, for example, RF or infrared signal transmission techniques. For example, for common web browsing the secure logic circuitry 120 scans for messages coming from remote port 80 that contains the HTTP 401 message. More generally, a dedicated internet protocol is used to handle credentials for more general services or the secure logic circuitry 120 scans for authentication for each type of internet protocol, e.g. POP on port 110. The secure logic circuitry 120 generates a message for prompting the user for provision of the key credential information which is then transmitted to the secure display 124 for alerting the user. Optionally, an audio alert is generated using, for example, a loudspeaker disposed in the secure user interface. For example, for a common web browsing situation, the secure display shows the embedded realm title such as "Some-Service Login".

Optionally, the secure logic circuitry interrupts communication between the keyboard 112 and the motherboard, for example, simultaneously when the message for prompting the user for provision of the key credential information is displayed.

Optionally, secure keyboard 126 can be enhanced with a second non-secured keyboard-to-PC connection link (not shown) that can transmit keystrokes from the enhanced secure keyboard 126 to the PC motherboard 110 in a non-secure mode, this optional enhanced secure keyboard 126 additionally having a user-activatable switch 128 that, when activated, temporarily blocks future transmission via the second non-secured keyboard-to-PC connection link to halt any typed keystrokes provided from the keyboard from reaching the motherboard 110, and when activated, additionally temporarily allowing future transmission of data from the enhanced secure keyboard 126 to the NIC 118 via cable 122 or such other manner known to a person skilled in the art. This eliminates the requirement for the PC user to have separate secure and non-secure keyboards.

The user enters the required key credential information which is then sent to the secure logic circuitry 120 via cable 122. Upon receipt, the secure logic circuitry 120 provides the key credential information to the remote computer 116 absent processing using the motherboard 110, for example, by generating a reply message with the key credential information contained therein. Once the key credential information has been received, conventional communication and operation proceeds. For the common web browsing situation the secure logic circuitry 120 additionally keeps track of outgoing HTTP GET requests, because within the HTTP protocol, an authorization message is supplied by retrying the originals HTTP GET request with an additional Authorization field added that contains the key credential information.

As is evident, there are numerous variants for coding the key credential information. For example, the HTTP protocol defines a low security Basic mode, where the key credential information is transmitted over the network using a base-64 transfer encoding. HTTP also includes a Digest based authentication mechanism, whereby the HTTP 401 message also contains a one-time unique server supplied "salt" value. In this authentication technique, the authentication reply is a specified hash computation of the user key credential information and the "salt" value, for which the server evaluates the correctness. Using this technique, a network based eavesdropper is not able to recover the key credential information. Of course, there are numerous other methods for encoding the key credential information using various encryption techniques. The secure logic circuitry 120 is adaptable to perform these various encoding techniques in a straightforward manner.

The system for secure provision of key credential information 100 is easily installed, for example, in the form of a NIC, into an existing insertion slot of a computer such as a PC or workstation with the secure user interface being connected thereto, allowing retrofitting of existing computer systems in a simple fashion.

Figure 2:
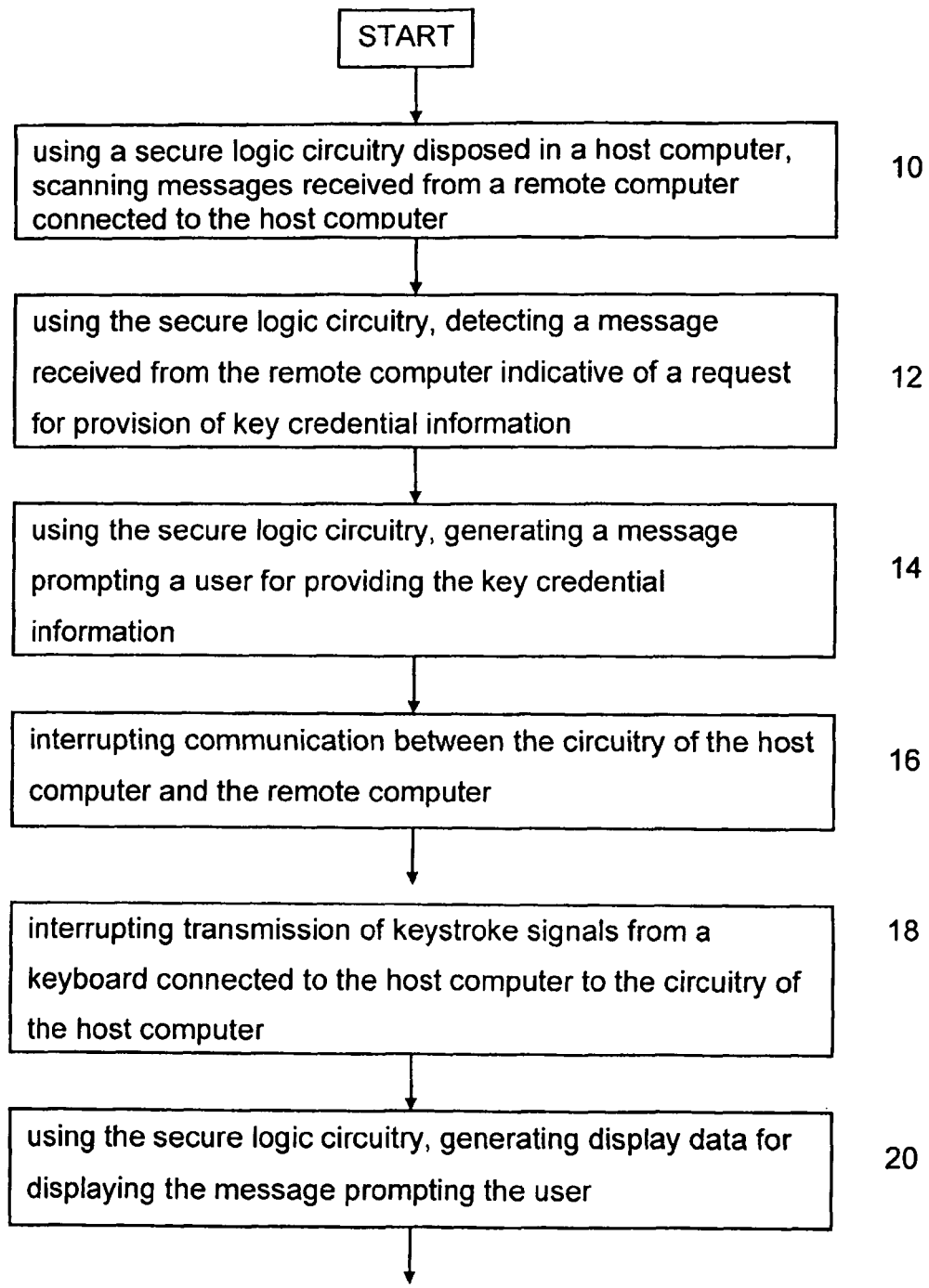
Figure 2:
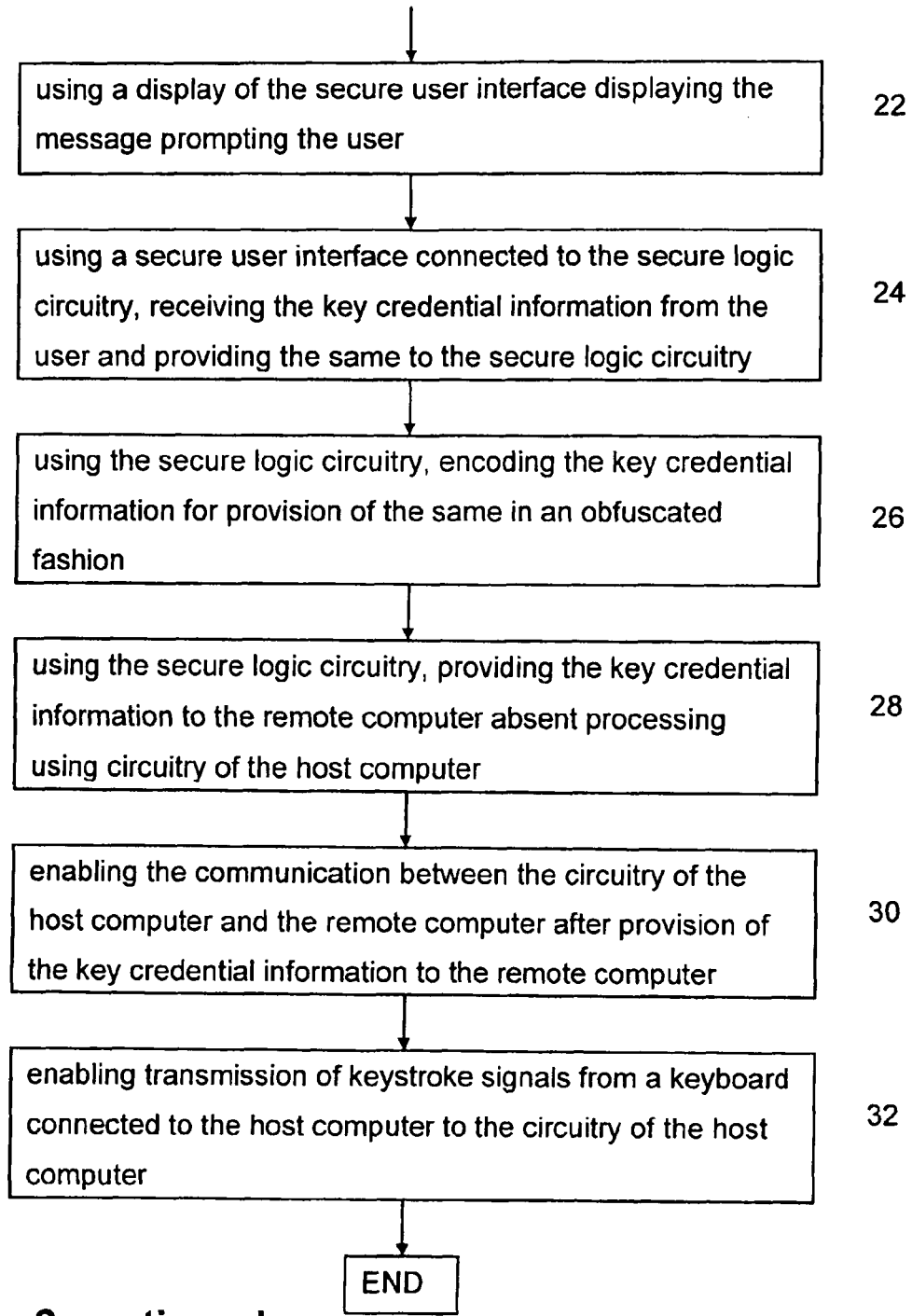

Referring to FIG. 2, a simplified flow diagram of a method for secure provision of key credential information according to a preferred embodiment of the invention is provided. The method is implemented using the system 100 described above. At 10, using the secure logic circuitry 120 disposed in the host computer 102 messages received from the remote computer 116 are scanned for detecting—12—a message received from the remote computer 116 which is indicative of a request for provision of key credential information. Upon detection of the message, the secure logic circuitry generates a message prompting a user for providing the key credential information—14. Optionally, the secure logic circuitry interrupts—16—communication between circuitry 110 of the host computer 102 and the remote computer 116 to increase security. At 18, transmission of keystroke signals to the circuitry 110 of the host computer 102 from a keyboard 112 connected to the host computer 102 is interrupted. The interruption is performed, for example, when a same keyboard connected to the motherboard 110 and to the secure logic circuitry 120 is used. For example, the user presses a toggle switch disposed on the keyboard prior to provision of the key credential information. Alternatively, the interruption is performed automatically, using the secure logic circuitry 120. Optionally, the interruption is also performed when two separate keyboards or a touch screen are employed to prevent accidental use of the keyboard connected to the motherboard 110 for provision of the key credential information by the user.

At 20, the secure logic circuitry generates display data for displaying the message prompting the user which is then displayed—22—using the secure display 124. Using the secure user interface connected to the secure logic circuitry 120, the key credential information is received from the user and provided to the secure logic circuitry 120, at 24. Using the secure logic circuitry 120, the key credential information is encoded—26—using one of various available encoding techniques for providing the key credential information in an obfuscated fashion. The secure logic circuitry 120 then sends—28—the key credential information to the remote computer 116 absent processing using circuitry 110 of the host computer 102.

After provision of the key credential information to the remote computer 116 communication between the circuitry 110 of the host computer 102 and the remote computer 116 is enabled—30—as well as transmission of keystroke signals from the keyboard to the circuitry 110 of the host computer 102, at 32.

It is understood that in the preferred embodiment of the present invention, the NIC of the present invention would not incorporate or utilize a conventional packet sniffer function that would capture the secure credential packets being transmitted therethrough (to mitigate the risk that malware could locate and acquire such data from the NIC).

It is also understood that, in the case of a laptop computer, an NIC of the present invention may be provided which is physically separate from, and connectable to the laptop by way of, for example, a USB port or other interface on the laptop, in a manner known to a person skilled in art (network access to and from laptop thereafter being provided by way of the NIC of the present invention).

The present invention has been described herein with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. A system for use with a host computer for securing key credential information provided by a user of the host computer against any malware resident in a motherboard of the host computer, the host computer configured for network communications with a remote computer through a communications network interface, the system comprising secure logic circuitry configured for connection between the communications network interface and the motherboard and a secure user interface configured for connection to the secure logic circuitry, wherein:
   (a) the secure logic circuitry is configured for:
      (i) detecting a request message indicative of a request for the key credential information;
      (ii) upon detection of the request message, generating a prompt message for transmission to the secure user interface for prompting the user to provide the key credential information; and,
      (iii) absent processing by the motherboard, receiving and providing the key credential information to the remote computer through the communications network interface while not providing the key credential information to the motherboard; and,
   (b) the secure user interface is configured for:
      (i) using the prompt message to alert the user to provide the key credential information;
      (ii) receiving the key credential information from the user; and,
      (iii) providing the key credential information to the secure logic circuitry;
   wherein the key credential information received by the secure user interface and provided to the secure logic circuitry is blocked from transmission to the motherboard and secured against any malware resident in the motherboard.

2. The system according to claim 1 wherein the request message is associated with a resource of the remote computer and comprises resource identifying information identifying the resource; the prompt message comprises the resource identifying information; and, the alert to the user comprises providing the resource identifying information to the user.

3. The system according to claim 2 wherein the secure user interface comprises a display for providing the alert to the user and a keyboard for the user to provide the key credential information.

4. The system according to claim 3 wherein the display and keyboard of the secure user interface comprise a touch screen and/or the secure user interface is configured for alerting the user by audio means.

5. The system according to claim 2 wherein the secure logic circuitry is configured for encrypting and decrypting the key credential information provided to the remote computer.

6. The system according to claim 1 wherein a host user interface is normally operative for providing communications in a non-secure mode from the user to the motherboard and the secure logic circuitry is further configured for disabling said non-secure mode communications from the user to the motherboard upon or before transmission of the prompt message to the secure user interface, and for re-enabling said unsecure communications from the user to the motherboard after providing the key credential information to the remote computer.

7. The system according to claim 6, further comprising a network interface card wherein the network interface card comprises the secure logic circuitry.

8. The system according to claim 7 wherein the secure user interface comprises a peripheral device configured for connecting to the network interface card.

9. The system according to claim 5 wherein the secure logic circuitry comprises a processor and memory, the memory having executable commands stored therein for execution on the processor.

10. The system according to claim 3, wherein the secure user interface notifies the user of the received key credential information before providing it to the secure logic circuitry.

11. The system according to claim 1 wherein a host user interface is normally operative for providing communications in a non-secure mode from the user to the motherboard, the secure user interface and the host user interface comprising a common keyboard that is shared between them and operable in a non-secure mode for normal operation as the host user interface or a secure mode as the secure user interface for securing the key credential information, the system further comprising means for activating operation of the keyboard in the secure mode prior to receiving the key credential information from the user and for returning operation of the keyboard to the non-secure mode after the secure logic circuitry has provided the key credential information to the remote computer wherein, in the secure mode, keystroke signals from the keyboard are blocked from transmission to the motherboard.

12. The system according to claim 5 wherein the remote computer comprises a server, the resource is an Internet service and the request message and the providing the key credential information to the remote computer are for a transaction pertaining to the Internet service.

13. A method for securing a host computer user's key credential information against malware resident in a motherboard of the host computer following a request for the key credential information from a remote computer with which the host computer is configured for communicating over a network, the method comprising:
  (a) providing a secure user interface configured for receiving the key credential information from the user;
  (b) detecting the request for the key credential information;
  (c) upon detecting the request, alerting the user to provide the key credential information to the secure user interface;
  (d) blocking transmission to the motherboard of the key credential information provided to the secure user interface; and
  (e) while blocking transmission of the key credential information to the motherboard and absent processing by the motherboard, receiving the key credential information from the secure user interface and providing the received key credential information to the remote computer, thereby securing the key credential information against any mal ware resident in the motherboard.

14. The method according to claim 13 whereby the request by the remote computer is associated with a resource of the remote computer and comprises resource identifying information identifying the resource; and, the alerting comprises providing to the user through the secure user interface the resource identifying information.

15. The method according to claim 14 whereby a host user interface is normally operative for providing communications in a non-secure mode from the user to the motherboard, the method further comprising disabling communications between the host user interface and the motherboard before the alerting and re-enabling communications between the host user interface and the motherboard after providing the received key credential information.

16. The method according to claim 15 whereby the secure user interface comprises any one or more of a group comprising a keyboard, a display and audio means.

17. The method according to claim 15 comprising notifying the user of the received key credential information before providing the key credential information to the remote computer.

* * * * *

UNITED STATES PATENT AND TRADEMARK OFFICE
CERTIFICATE OF CORRECTION

PATENT NO. : 8,302,174 B2
APPLICATION NO. : 13/140383
DATED : October 30, 2012
INVENTOR(S) : McAlear It is certified that error appears in the above-identified patent and that said Letters Patent is hereby corrected as shown below:

Please delete Item (74) and insert Item -- (74) Oppedahl Patent Law Firm LLC -- as shown on the attached page Signed and Sealed this
Fifth Day of March, 2013

Teresa Stanek Rea
*Acting Director of the United States Patent and Trademark Office*

CERTIFICATE OF CORRECTION (continued)

(12) United States Patent
McAlear

(10) Patent No.: US 8,302,174 B2
(45) Date of Patent: Oct. 30, 2012

(54) SYSTEM, DEVICE AND METHOD FOR SECURE PROVISION OF KEY CREDENTIAL INFORMATION

(75) Inventor: James A McAlear, Ottawa (CA)

(73) Assignee: James A. McAlear, Ottawa, ONT (CA)

( * ) Notice: Subject to any disclaimer, the term of this patent is extended or adjusted under 35 U.S.C. 154(b) by 0 days.

(21) Appl. No.: 13/140,383

(22) PCT Filed: Dec. 14, 2009

(86) PCT No.: PCT/CA2009/001832
§ 371 (c)(1),
(2), (4) Date: Jun. 17, 2011

(87) PCT Pub. No.: WO2010/069056
PCT Pub. Date: Jun. 24, 2010

(65) Prior Publication Data
US 2012/0131651 A1 May 24, 2012

Related U.S. Application Data

(63) Continuation of application No. 12/321,519, filed on Jan. 22, 2009.

(30) Foreign Application Priority Data
Dec. 18, 2008 (CA) .................................. 2650163

(51) Int. Cl.
*G06F 21/00* (2006.01)
(52) U.S. Cl. ............ 726/7; 709/223; 709/248; 380/278; 380/466; 713/151; 713/153
(58) Field of Classification Search .................. 726/7
See application file for complete search history.

(56) References Cited

U.S. PATENT DOCUMENTS

| 5,822,435 A | 10/1998 | Boebert |
| 6,681,327 B1 | 1/2004 | Jardin |
| 6,834,271 B1 | 12/2004 | Hodgson |

(Continued)

FOREIGN PATENT DOCUMENTS

CA 2280869 8/1998

(Continued)

OTHER PUBLICATIONS

Office Action mailed Jan. 10, 2012 in copending U.S. Appl. No. 12/321,519, published as US-2010-0186070.

(Continued)

*Primary Examiner* — David Pearson
*Assistant Examiner* — Muhfuzur Rahman
(74) *Attorney, Agent, or Firm* — Oppedahl Patent Law Firm LLC

(57) ABSTRACT

A system for secure provision of key credential information is provided. The system comprises secure logic circuitry for being disposed in a host computer. The secure logic circuitry detects a message received from a remote computer connected to the host computer and indicative of a request for provision of the key credential information; generates a message for prompting a user for provision of the key credential information; receives the key credential information; and provides the key credential information to the remote computer absent processing using circuitry of the host computer. The system further comprises a secure user interface connected to the secure logic circuitry for receiving the key credential information from the user and providing the same to the secure logic circuitry.

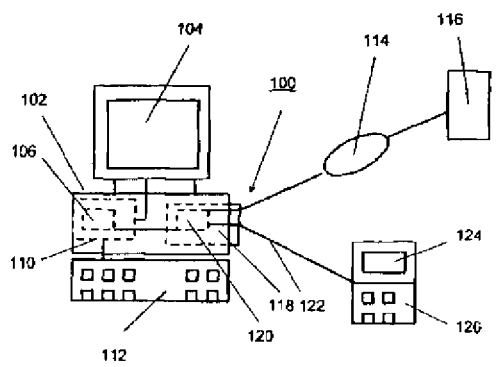
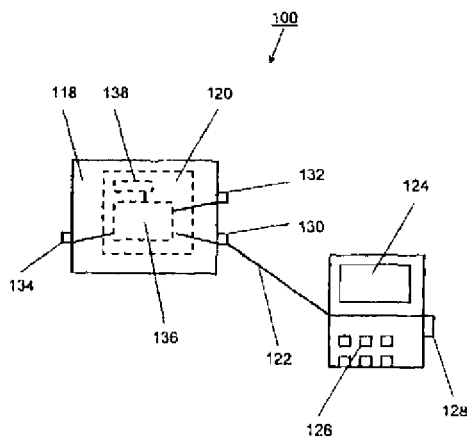

17 Claims, 4 Drawing Sheets